(12) United States Patent
Cheremkhin

(10) Patent No.: US 12,019,694 B1
(45) Date of Patent: *Jun. 25, 2024

(54) APPARATUS AND METHOD FOR MATCHING INDIVIDUALS BASED UPON A COMMITMENT DISPOSITION CRITERION

(71) Applicant: AMI Holdings Limited, Hamilton (BM)

(72) Inventor: Maxim Cheremkhin, London (GB)

(73) Assignee: Bumble IP Holdo LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,962

(22) Filed: Jul. 11, 2022

Related U.S. Application Data

(63) Continuation of application No. 15/916,086, filed on Mar. 8, 2018, now Pat. No. 11,386,172.

(51) Int. Cl.
*G06F 16/00* (2019.01)
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC ............................ G06F 16/9535; G06Q 50/01
USPC ....................................................... 707/754
See application file for complete search history.

(56) References Cited

U.S. PATENT DOCUMENTS

| | | | | |
|---|---|---|---|---|
| 6,073,130 A * | 6/2000 | Jacobson | .......... | G06F 16/24578 707/999.005 |
| 6,272,467 B1 * | 8/2001 | Durand | .................. | G06Q 10/02 705/26.1 |
| 7,085,806 B1 * | 8/2006 | Shapira | .................. | G06Q 30/08 709/202 |
| 8,166,026 B1 | 4/2012 | Sadler | | |
| 8,566,327 B2 | 10/2013 | Carrico et al. | | |
| 8,635,167 B2 | 1/2014 | Buckwalter et al. | | |
| 9,070,144 B1 | 6/2015 | Zeviar | | |
| D755,814 S | 5/2016 | Rad et al. | | |
| 9,449,282 B2 | 9/2016 | Diaz et al. | | |
| D779,540 S | 2/2017 | Rad et al. | | |
| D781,311 S | 3/2017 | Rad et al. | | |
| D781,334 S | 3/2017 | Rad et al. | | |
| D791,809 S | 7/2017 | Rad et al. | | |

(Continued)

OTHER PUBLICATIONS

Finkel et al., "Online Dating: A Critical Analysis From the Perspective of Psychological Science," Association for Psychological Science, Mar. 7, 2012, 64 pages.

*Primary Examiner* — Monica M Pyo

(74) *Attorney, Agent, or Firm* — Fish & Richardson P.C.

(57) ABSTRACT

A computer implemented method includes supplying to a client device prompts for a first individual to specify matching criteria for a potential introduction to a second individual, where the matching criteria includes criterion to specify commitment disposition. Matching criteria is collected. Matches between the first individual and a pool of individuals are generated based upon the matching criteria. The matches are supplied to the client device. Match acceptances are collected from the client device. Network communication is enabled between the first individual and the second individual in response to a match between the first individual and the second individual and a match acceptance by at least one of the first individual and the second individual.

19 Claims, 3 Drawing Sheets

(56) References Cited

U.S. PATENT DOCUMENTS

| | | | |
|---|---|---|---|
| 9,733,811 B2 | 8/2017 | Rad et al. | |
| D798,314 S | 9/2017 | Rad et al. | |
| 9,959,023 B2 | 5/2018 | Rad et al. | |
| 10,489,445 B1 | 11/2019 | Carter | |
| 11,386,172 B1 * | 7/2022 | Cheremkhin | G06Q 30/02 |
| 11,425,213 B2 * | 8/2022 | Rad | G06Q 50/01 |
| 2002/0103792 A1 | 8/2002 | Blank | |
| 2003/0093405 A1 * | 5/2003 | Mayer | G06Q 50/01 |
| 2006/0287878 A1 * | 12/2006 | Wadhwa | G06Q 30/00 |
| | | | 705/7.33 |
| 2007/0061159 A1 * | 3/2007 | Vest | G06Q 30/02 |
| | | | 705/319 |
| 2008/0086431 A1 * | 4/2008 | Robinson | A63F 13/30 |
| | | | 706/11 |
| 2008/0301557 A1 | 12/2008 | Kotlyar | |
| 2009/0292677 A1 | 11/2009 | Kim | |
| 2009/0307610 A1 | 12/2009 | Ryan | |
| 2012/0005204 A1 * | 1/2012 | Diaz | G06N 7/01 |
| | | | 707/E17.014 |
| 2013/0254680 A1 | 9/2013 | Buhr | |
| 2013/0335509 A1 | 12/2013 | Cafferata | |
| 2014/0032434 A1 * | 1/2014 | Kumar | H04L 67/306 |
| | | | 705/319 |
| 2014/0344031 A1 | 11/2014 | Lineberger | |
| 2016/0140671 A1 | 5/2016 | Hong | |
| 2016/0275531 A1 * | 9/2016 | Martyn | G06Q 30/0203 |
| 2017/0017648 A1 | 1/2017 | Pearlman | |
| 2017/0300935 A1 | 10/2017 | Herbst | |
| 2018/0150205 A1 | 5/2018 | Rad et al. | |
| 2018/0285986 A1 | 10/2018 | Perry et al. | |
| 2018/0292981 A1 | 10/2018 | Rad et al. | |
| 2019/0080012 A1 | 3/2019 | Huang | |

* cited by examiner under 35 U.S.C. § 120 to U.S.
APPARATUS AND METHOD FOR MATCHING INDIVIDUALS BASED UPON A COMMITMENT DISPOSITION CRITERION

CROSS-REFERENCE TO RELATED APPLICATIONS

This application is a continuation application of and claims the benefit of priority under 35 U.S.C. § 120 to U.S. application Ser. No. 15/916,086, filed on Mar. 8, 2018, now U.S. Pat. No. 11,386,172, the contents of which are hereby incorporated by reference.

FIELD OF THE INVENTION

This invention relates generally to social media dating applications deployed in computer networks. More particularly, this invention is directed toward techniques for matching individuals based upon a commitment disposition criterion.

BACKGROUND OF THE INVENTION

Many individuals avoid social medial dating applications that require a user to input extensive information about himself or herself. Therefore, several popular social media dating applications require only basic information, such as age preference, location range and a photo. While such minimalistic approaches have appeal, they may lead to inappropriate matches. Therefore, there is a need to maintain a simple social media dating application entry process that collects sufficient information to establish improved matches.

SUMMARY OF THE INVENTION

A computer implemented method includes supplying to a client device prompts for a first individual to specify matching criteria for a potential introduction to a second individual, where the matching criteria includes criterion to specify commitment disposition. Matching criteria is collected. Matches between the first individual and a pool of individuals are generated based upon the matching criteria. The matches are supplied to the client device. Match acceptances are collected from the client device. Network communication is enabled between the first individual and the second individual in response to a match between the first individual and the second individual and a match acceptance by at least one of the first individual and the second individual.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
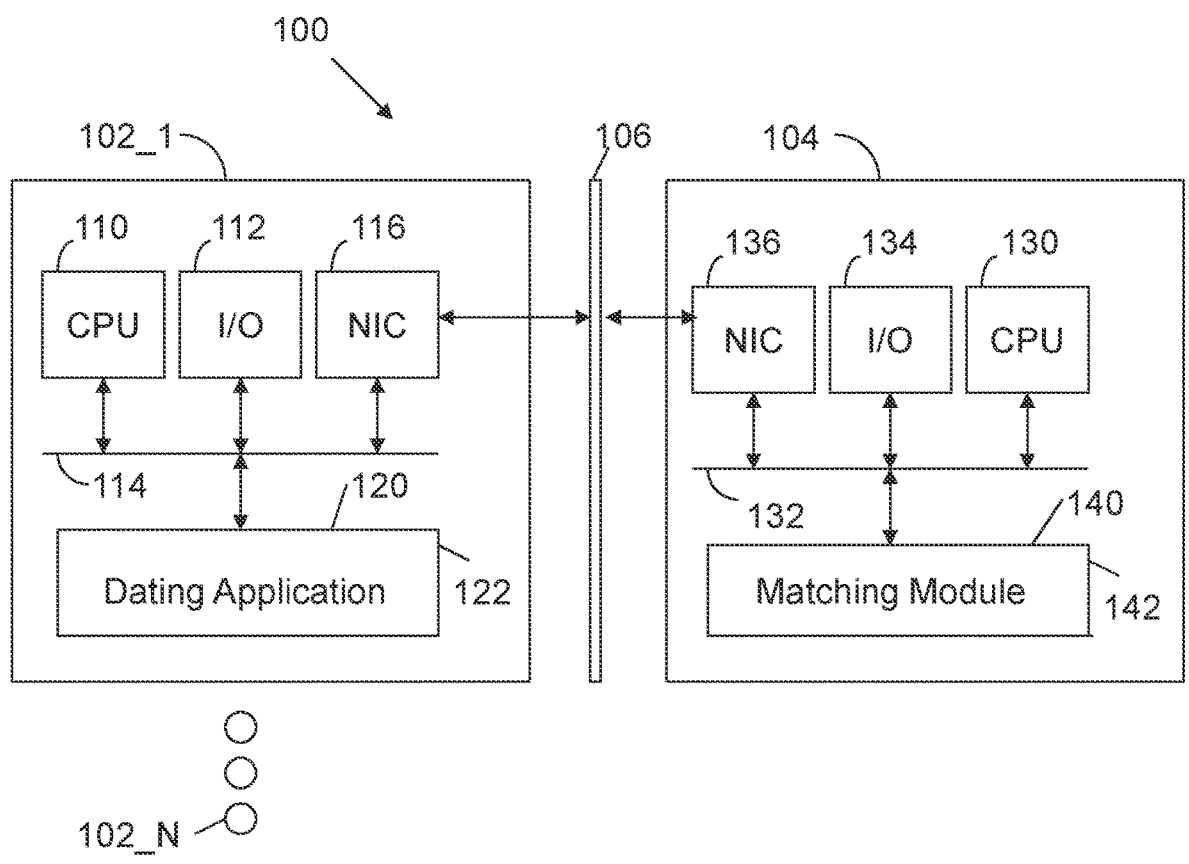
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. Each client device 102 includes a processor (e.g., central processing unit) 110 in communication with input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by the processor 110. In particular, the memory 120 stores a dating application 122, which communicates with server 104 to coordinate introductions between individuals that have been identified as potential matches, and where at least one individual has accepted the potential match. Typically, each client device 102_1 through 102_N is a mobile device executing the dating application 122. Different client devices 102_1 through 102_N are operated by different individuals that subscribe to the same dating application 122.

Server 104 includes standard components, such as a processor 130, bus 132, input/output devices 134 and a network interface circuit 136 to provide connectivity to network 106. A memory 140 is connected to the bus 132. The memory 140 stores a matching module 142 with instructions executed by the processor 130 to implement operations disclosed in connection with FIG. 2.

Figure 2:
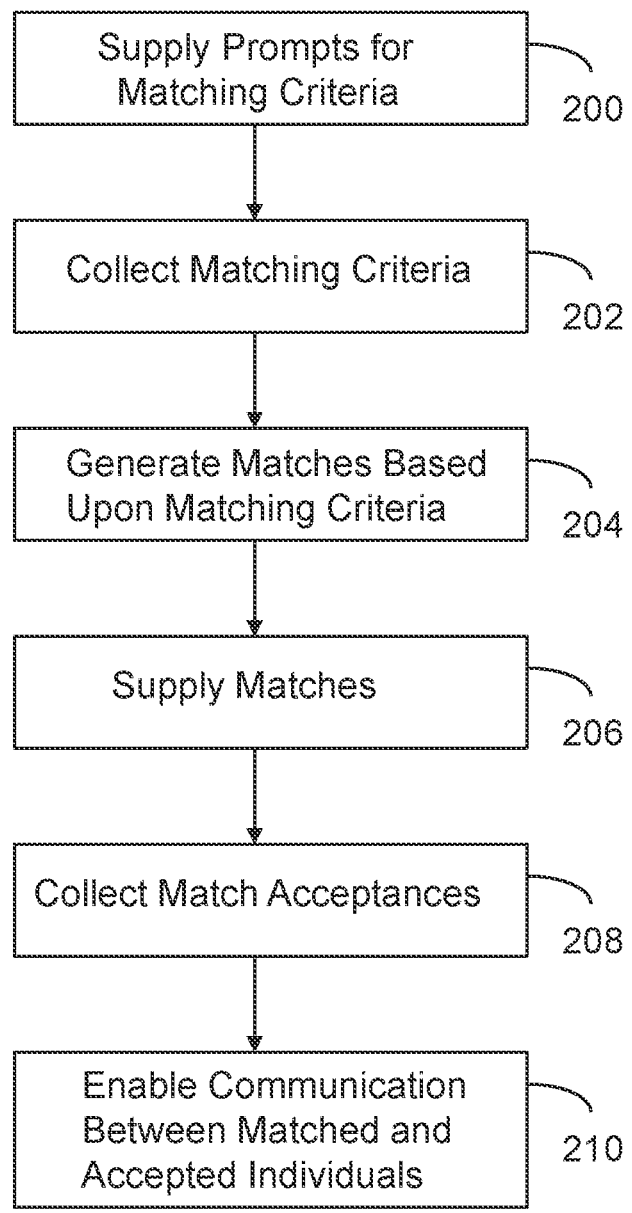
FIG. 2 illustrates processing operations performed in accordance with an embodiment of the invention.

Turning to FIG. 2, the matching module 142 initially supplies prompts for matching criteria 200. That is, the matching module 142 supplies to a client device operated by a first individual a user interface with prompts that are used to collect matching criteria for a potential introduction to a second individual. The matching criteria includes criterion to specify commitment disposition.

Figure 3:
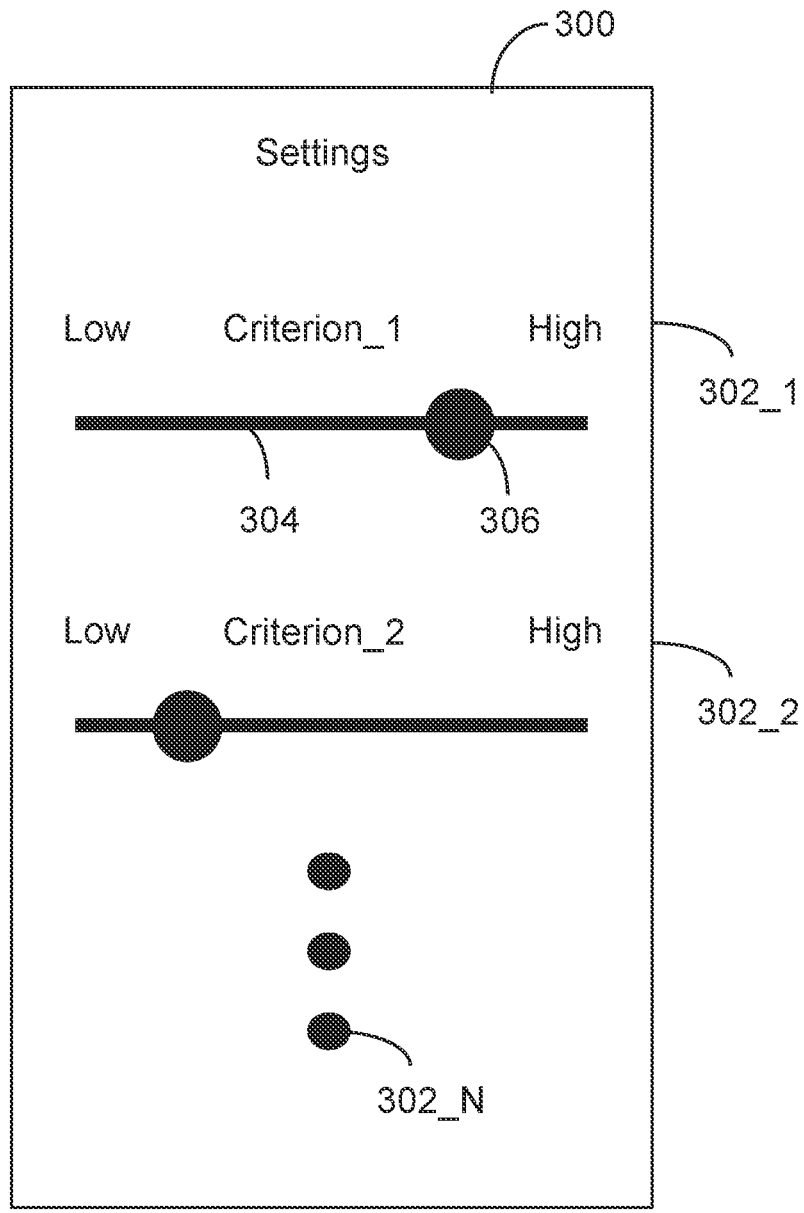
FIG. 3 illustrates a user interface configured in accordance with an embodiment of the invention.

FIG. 3 illustrates a user interface 300 that may be supplied from the matching module 142 to a client device 102 in accordance with an embodiment of the invention. The user interface 300 includes individual prompts 302_1 through 302_N for different matching criteria. At least one criterion, say criterion_1, 302_1 specifies a commitment disposition. A slider bar 304 with a feature 306 may be used to specify the commitment disposition between a high level (e.g., "Mr. Right") and a low level (e.g., "Mr. Right Now"). A gesture (e.g., a swiping motion) is applied to the user interface 300 to specify matching criteria. In embodiments, the gesture is applied to a slider bar with a feature, as shown in FIG. 3. Interface 300 also shows additional criterion 3022 through 302_N, which may include a search radius (e.g., individuals with 10 miles) and an age range.

Thus, the interface 300 provides a simple social media dating application entry process that collects sufficient information to establish improved matches. Individuals are generally more eager to supply information about commitment disposition compared to educational background, professional status, etc.

Returning to FIG. 2, matching criteria is collected 202 from client devices 102_1 through 102_N at the server 104. The matching module 142 then generates matches 204 based upon matching criteria. The matching criteria may be based upon any number of factors and may user any number of techniques including applied rules, collaborative filtering and/or machine learning. However, an overriding filter condition is commitment disposition criterion, which must match within some specified range (e.g., two individuals may not deviate in position on the slider 304 in FIG. 3 by more than 25%).

The matches are then supplied 206 from the matching module 142 at the server 104 to one or more client devices 102. Match acceptances are then collected 208 from client devices 102. For example, a photograph of an individual may be presented and a first gesture (e.g., a swipe down on the screen or a swipe to the left on the screen) may indicate no interest, while a second gesture (e.g., a swipe up on the screen or a swipe to the right on the screen) may indicate interest.

Network communication is then enabled between matched and accepted individuals 210. For example, network communication in the form of a text message may be enabled between a first individual and a second individual in response to a match between the first individual and the second individual and a match acceptance by at least one of the first individual and the second individual. The criteria to enable communication may be configured in a variety of manners. For example, it may be specified that only one gender may initiate communication. Enabling communication may be predicated upon a single individual accepting a match. Alternately, enabling communication may be predicated upon a requirement that both a first individual and a second individual accept a match.

Thus, the matching module 142 facilitates a digital service that can connect individual users through mutual agreement (matching) for purposes including, but not exclusively, socialising, networking, and dating. The dating application 122 may be implemented as an application for a mobile device, a website or a standalone computer application.

A user's personal profile can include name, age, city, photographs, biographical text, links to social media profiles on other networks, and a range of other fields that allow users to characterize themselves. Once a profile is complete, a user can begin to view the profiles of other users, while the new profile is circulated among the user base.

In one embodiment, a user is able to filter the profiles of other users that are served to them for viewing through setting restrictions upon the age, location, or potentially any other personal attribute.

The commitment disposition criterion discussed m connection with FIG. 3 may be referred to as a "mood scale". The feature 306 can be moved on scale 304 between different 'moods'. Moving the indicator button 306 on scale 304 serves two purposes for the user.

First, it creates a new personal 'mood' attribute that is associated with that user's profile along with the other provided personal information. The mood scale characterizes whether the user is looking for a serious match (e.g., "Mr. Right"), a spontaneous match (e.g., "Mr. Right Now"), or that they are not sure (e.g., "Mr. Who Knows").

The second purpose that moving the indicator serves is to create an additional filter upon the set of user profiles served for viewing. A user having moved an indicator to the 'Mr Right' point on the scale, will therefore be shown the profiles of other users who have also moved their indicators to that region of the scale. Through the use of the indicator scale users are able to indicate what their intentions are as they look for matches, and also filter the other users available to view. This feature increases the quality of the matches that are possible in a social network by the filtering of possible users based on their intentions. In one embodiment, a user who leaves the indicator in a central position (e.g., "Mr Who Knows") can be served users from within the "Mr Who Knows" pool, but also users from the other options on the scale. Users are also able to blend multiple 'moods' by moving their indicator button to be in a position between identified 'moods' on the scale, and are served the profiles of other users from both pools.

A user receives profiles of other users who have met the filtering criteria the user is able to explore the personal information that has been added to a profile. Profiles are served to the user one-by-one, with the option to look through multiple pictures per profile, expand text, and click through to external information and profiles on other social networks. The user is able to see the commitment disposition or "mood" that the other user has selected. To ascertain the mutual agreement to connect two users together, every profile viewed must be 'voted' on. Having viewed the personal profile of another user, the viewing user swipes (click and drag the profile using their finger) the served profile off the screen in a certain direction (e.g., right or up) if they would like to connect with that specific user or (e.g., left or down) if they do not.

In one embodiment, once a user has voted yes upon the profile of another user, the matching module 142 places the profile of the first user into the queue of profiles to be viewed by the second user. Through this mechanism the matching module 142 is able to accelerate the pace with which two users may view each-other's profiles than would happen in a purely organic system of profile selection.

In one embodiment, users are also able to send a stronger yes vote through the use of a 'Spark' button on each users' profile. This serves not only as a Yes vote, but also triggers the matching module 142 to notify the 'sparked' user that there has been a user expressing a high level of interest in them. A user may be notified of the elevated interest.

In one embodiment, the system does not require that both users be online at the same time for a match to be suggested. In one embodiment, when one user votes yes and the other user votes no, no further connection is established between the two users, and their profiles may not be shown to each-other again (or they may be shown again depending on changes within their profile, location, search parameters, or because of time elapsed). When two users both mutually vote 'yes' upon the other user's profile, a connection is established between the two accounts which allows for direct communication. In one embodiment, matched users are directed to a direct messaging system supported by server 104. This system can display elements of a user's profile in order to increase recognition of the other user (e.g., name, age, photograph).

Within the chat system users are also shown the 'mood' in which the other user was in when the match was created. Through this the system creates a unique mechanism through which the intention of each user is communicated to other users within the social network. Once users are within the chat function, they can then send direct messages back and forth to one-another. Within the chat function, users are also able to modify the status of the connection by 'unmatching', which is to revoke their side of the mutual agreement to be connected. Users can also 'block' the other user, which serves the same purpose as 'unmatching', but ensures their profile will not be served to the 'blocking' user again.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs. DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   receiving, from a client device, matching criteria specified by a first individual at a first time in a sequence of time steps, the matching criteria including an indication of an intention for a relationship specified by the first individual at the first time, wherein the intention is selected from a range of available intentions, and wherein the selected intention can be modified at a second time in the sequence of time steps;
   for each time in the sequence of time steps, generating a match between the first individual and at least one individual in a pool of individuals based upon the matching criteria, including identifying the at least one individual in the pool of individuals having an intention at the time for a relationship that is consistent with the intention specified by the first individual;
   transmitting to the client device data configured to cause the client device to display:
   (a) an indication of the match between the first individual and the at least one individual in the pool of individuals, and
   (b) an indication of the intention for a relationship for the at least one individual at the time for display with the match, wherein the indication of the intention for the at least one individual comprises a presentation of a particular intention selected from the range of available intentions, wherein the presentation of the particular intention selected from the range of available intentions comprises a graphical user interface element identifying the particular intention;
   collecting a match acceptance from the client device for the at least one individual; and
   in response to the match acceptance, enabling network communication between the first individual and the at least one individual.

2. The computer implemented method of claim 1, comprising receiving a gesture applied to the client device, the gesture specifying the intention.

3. The computer implemented method of claim 2, wherein the gesture is applied to a user interface element in a graphical user interface displayed on the client device.

4. The computer implemented method of claim 1, wherein transmitting the indication of the match to the client device includes supplying indicia of a high level of interest for the first individual by a potential match.

5. The computer implemented method of claim 1, wherein identifying the at least one individual having an intention that is consistent with the intention specified by the first individual includes identifying the at least one individual having an intention that is the same as the intention specified by the first individual.

6. The computer implemented method of claim 1, wherein identifying the at least one individual having an intention that is consistent with the intention specified by the first individual includes identifying the at least one individual having an intention that is different from the intention specified by the first individual.

7. The computer implemented method of claim 1, wherein enabling network communications between the first individual and the at least one individual comprises enabling access to a direct messaging system by the first individual and the at least one individual.

8. The computer implemented method of claim 7, wherein the direct messaging system is configured to display the intention of the at least one individual.

9. A system, comprising:
   one or more processors; and
   one or more non-transitory computer-readable storage media storing instructions which, when executed by the one or more processors, cause the one or more processors to perform operations comprising:
   receiving, from a client device, matching criteria specified by a first individual at a first time in a sequence of time steps, the matching criteria including an indication of an intention for a relationship specified by the first individual at the first time, wherein the intention is selected from a range of available intentions, and wherein the selected intention can be modified at a second time in the sequence of time steps;
   for each time in the sequence of time steps, generating a match between the first individual and at least one individual in a pool of individuals based upon the matching criteria, including identifying the at least one individual in the pool of individuals having an intention at the time for a relationship that is consistent with the intention specified by the first individual;
   transmitting to the client device data configured to cause the client device to display:
   (a) an indication of the match between the first individual and the at least one individual in the pool of individuals, and
   (b) an indication of the intention for a relationship for the at least one individual at the time for display with the match, wherein the indication of the intention for the at least one individual comprises a presentation of a particular intention selected from the range of available intentions, wherein the presentation of the particular intention selected from the range of available intentions comprises a graphical user interface element identifying the particular intention;

collecting a match acceptance from the client device for the at least one individual; and in response to the match acceptance, enabling network communication between the first individual and the at least one individual.

10. The system of claim 9, wherein the intention is specified by a gesture applied to a user interface element in a user interface presented on the client device.

11. The system of claim 9, wherein identifying the at least one individual having an intention that is consistent with the intention specified by the first individual includes identifying the at least one individual having an intention that is the same as the intention specified by the first individual.

12. The system of claim 9, wherein identifying the at least one individual having an intention that is consistent with the intention specified by the first individual includes identifying the at least one individual having an intention that is different from the intention specified by the first individual.

13. The system of claim 9, wherein enabling network communications between the first individual and the at least one individual comprises enabling access to a direct messaging system by the first individual and the at least one individual.

14. The system of claim 13, wherein the direct messaging system is configured to display the intention of the at least one individual.

15. A non-transitory computer-readable medium storing instructions which, when executed by one or more processors, cause the one or more processors to perform operations comprising:

receiving, from a client device, matching criteria specified by a first individual at a first time in a sequence of time steps, the matching criteria including an indication of an intention for a relationship specified by the first individual at the first time, wherein the intention is selected from a range of available intentions, and wherein the selected intention can be modified at a second time in the sequence of time steps;

for each time in the sequence of time steps, generating a match between the first individual and at least one individual in a pool of individuals based upon the matching criteria, including identifying the at least one individual in the pool of individuals having an intention at the time for a relationship that is consistent with the intention specified by the first individual;

transmitting to the client device data configured to cause the client device to display:

(a) an indication of the match between the first individual and the at least one individual in the pool of individuals, and (b) an indication of the intention for a relationship for the at least one individual at the time for display with the match, wherein the indication of the intention for the at least one individual comprises a presentation of a particular intention selected from the range of available intentions, wherein the presentation of the particular intention selected from the range of available intentions comprises a graphical user interface element identifying the particular intention;

collecting a match acceptance from the client device for the at least one individual; and in response to the match acceptance, enabling network communication between the first individual and the at least one individual.

16. The non-transitory computer-readable medium of claim 15, wherein identifying the at least one individual having an intention that is consistent with the intention specified by the first individual includes identifying the at least one individual having an intention that is the same as the intention specified by the first individual.

17. The non-transitory computer-readable medium of claim 15, wherein identifying the at least one individual having an intention that is consistent with the intention specified by the first individual includes identifying the at least one individual having an intention that is different from the intention specified by the first individual.

18. The non-transitory computer-readable medium of claim 15, wherein enabling network communications between the first individual and the at least one individual comprises enabling access to a direct messaging system by the first individual and the at least one individual.

19. The non-transitory computer-readable medium of claim 18, wherein the direct messaging system is configured to display the intention of the at least one individual.

* * * * *